No. 767,372. PATENTED AUG. 16, 1904.
V. ARCIONI.
DAMPING DEVICE FOR MEASURING INSTRUMENTS.
APPLICATION FILED JUNE 26, 1902.
NO MODEL.
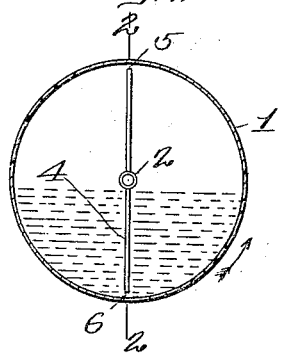
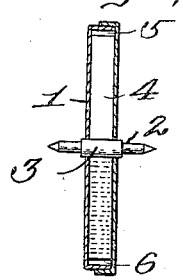
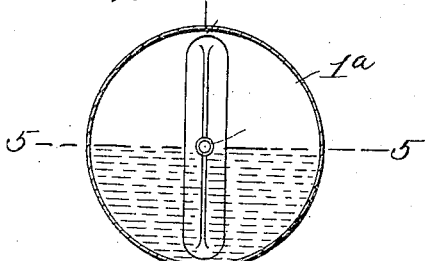
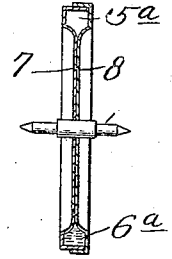
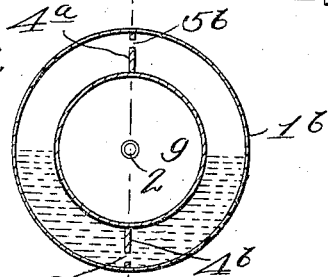
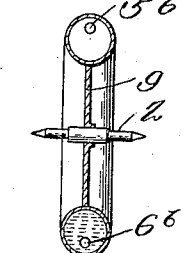
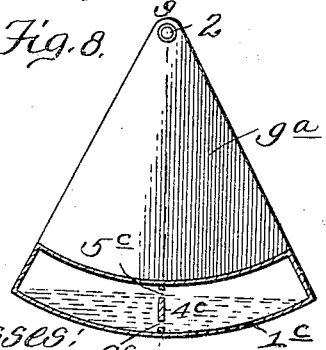
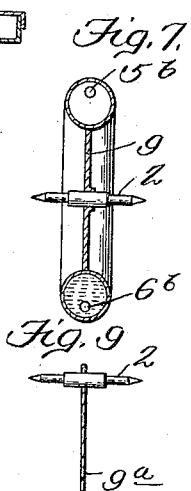
Inventor
Vittorio Arcioni
By James L. Norris
Atty.
Witnesses:

No. 767,372.

Patented August 16, 1904.

UNITED STATES PATENT OFFICE.

VITTORIO ARCIONI, OF SPOLETO, ITALY, ASSIGNOR TO CAMILLO OLIVETTI, OF IVREA, ITALY.

DAMPING DEVICE FOR MEASURING INSTRUMENTS.

SPECIFICATION forming part of Letters Patent No. 767,372, dated August 16, 1904.

Application filed June 26, 1902. Serial No. 113,324. (No model.)

*To all whom it may concern:*

Be it known that I, VITTORIO ARCIONI, a subject of the King of Italy, residing at Spoleto, Italy, have invented certain new and useful Improvements in Damping Devices for Measuring Instruments, of which the following is a specification.

My invention relates to damping devices for measuring instruments and the like, particularly though not exclusively adapted for electrical measuring instruments, the object of the same being to provide novel means for overcoming or reducing to a minimum the oscillations or vibrations of the moving parts of the instrument, so as to enable the readings upon the scale to be readily effected.

To the end stated the invention consists in a device or apparatus, as hereinafter described and claimed.

In the drawings forming part of this specification, Figure 1 is a sectional elevation of a damping device constructed in accordance with my invention. Fig. 2 is a vertical central section on the line 2 2 of Fig. 1. Fig. 3 is a view similar to Fig. 1, showing a modified form of the device. Fig. 4 is a section on the line 4 4 of Fig. 3. Fig. 5 is a horizontal section on the line 5 5 of Fig. 3. Fig. 6 is a sectional view similar to Figs. 1 and 3, showing another modification of the invention. Fig. 7 is a sectional view on the line 7 7 of Fig. 6. Fig. 8 is a sectional view similar to Fig. 1, showing another modification of the device; and Fig. 9 is a vertical section on the line 9 9 of Fig. 8.

Like reference-numerals indicate like parts in the different views.

The body 1 of my improved damping device is circular in form and is made hollow, so as to contain within it a body of liquid. The liquid is introduced into the interior of the body 1 in any suitable way; but said body after the liquid is placed therein is sealed up, so as to prevent the escape of the liquid. The body 1 is mounted upon the shaft or axis 2 of the movable part of the electric measuring instrument, the same being secured thereto by way of a central hub 3. Located within the body and extending diametrically through the same is a partition or diaphragm 4, the same being secured to the hub 3, as shown. The opposite ends of the partition 4 are provided with the openings or passages 5 6. When the parts of the device are in their normal positions, the shaft or axis 2 is substantially horizontal and the diaphragm or partition 4 is substantially vertical. During the turning movement of the shaft or axis 2 and of the body 1, secured thereto, the mass of liquid within the body 1 will be elevated on one side or the other by the engagement of the lower portion of the partition 4 therewith. The said liquid therefore serves to retard the movement of the body 1, but not to arrest said movement entirely. The liquid during the movement of the body 1 passes through the contracted opening 6 in the lower end of the partition 4, and the air displaced passes through the upper contracted opening 5 in said partition. The device therefore serves to prevent oscillations or vibrations of the movable part of the measuring instrument, so as to render more easy the reading of the indications upon the scale.

Instead of making the diaphragm 4 in a separate piece from the body, as shown in Figs. 1 and 2 of the drawings, the same may be made integral with the walls of said body. This construction is clearly shown in Figs. 3, 4, and 5 of the drawings, wherein the body $1^a$ has been shown with its front and rear plane walls bent inwardly along a diametrical line, forming indentations in the outer surfaces of said walls and inwardly-extending ribs or projections 7 and 8 on the inner surfaces of said walls. The said ribs or projections unitedly form a partition or diaphragm within the hollow body $1^a$ which corresponds in function with the diaphragm 4, hereinbefore referred to, the opposite ends of the ribs 7 8 terminating a short distance from the inner surface of the peripheral wall of the body $1^a$ to form the openings or passages $5^a$ and $6^a$. The operation of this form of my invention is the same as that described with reference to the construction shown in Figs. 1 and 2.

As a further modification of my invention

I may make the body 1ᵇ in annular form or in the form of a hollow ring, this construction being clearly shown in Figs. 6 and 7 of the drawings. In cross-section the ring portion of the body 1ᵇ may be circular or of any other suitable configuration. The said body is connected to the shaft or axis 2 by means of a circular web 9. The hollow ring, which constitutes the body 1ᵇ, is partially filled with liquid, as before, and is also provided at diametrically opposite points with the diaphragms or partitions 4ᵃ and 4ᵇ, the same being provided with contracted openings or passages 5ᵇ and 6ᵇ, respectively. The operation of this form of my invention is the same as those above described.

Instead of making the body 1ᵇ in the form of a continuous hollow ring containing liquid the same may be made in segmental form, as shown in Figs. 8 and 9 of the drawings. In this form of my invention the hollow body 1ᶜ is connected, through a segmental web 9ᵃ, with the shaft or axis 2, said hollow body being circular or other suitable shape in cross-section and curved upon the arc of a circle of which the axis 2 is the center. Within the hollow body 1ᶜ is located a diaphragm or partition 4ᶜ, having a plurality of openings 5ᶜ and 6ᶜ therein, located one above the other. The opening 6ᶜ provides for the passage of the liquid therethrough during the oscillatory movement of the body 1, and the opening 5ᶜ provides for the passage therethrough of the displaced air within the hollow body.

It will be noted that in each form of my invention the partition or partitions within the hollow body of the device are radially disposed—that is to say, they are in a plane which intersects the shaft or axis 2. By this construction the same damping effect is produced upon the movable part of the measuring instrument, no matter in which direction the same may be actuated. Were the partitions or diaphragms otherwise disposed than as above described, the body of the damping device would move more freely in one direction than in the other, with the result that while the device might be adjusted to overcome vibrations or oscillations when moved in one direction it would be ineffective in overcoming such vibrations or oscillations when moved in the opposite direction.

I have herein specifically referred to the invention as applied in connection with electrical measuring instruments. It is to be understood, however, that I do not restrict the invention to such use, but claim it for all the uses to which it is adapted.

Having now described my invention, what I claim as new, and desire to secure by Letters Patent, is—

1. A damping device consisting of a hollow body adapted to contain a liquid and mounted upon an axis, liquid in said body in the lower part, a partition separating the space above the liquid into two chambers and providing an opening affording communication between the two chambers, the said opening being so disposed that it permits of the gradual transference of the air in said chambers above the liquid from one chamber to the other upon the partial rotation of the said hollow body.

2. A damping device consisting of a hollow body adapted to contain a liquid and mounted upon an axis, liquid in said body in the lower part, a partition separating said body into two chambers and provided with openings above and below the liquid to afford communications above and below the liquid between said chambers, said openings being so disposed that they permit of the gradual transference of the air in the upper and liquid in the lower part from one chamber to the other upon partial rotation of the said hollow body.

In testimony whereof I have hereunto set my hand in presence of two subscribing witnesses.

VITTORIO ARCIONI.

Witnesses:
 IGNAZIO VERROTTI,
 ANGELO LILI.